(12) United States Patent
Yang et al.

(10) Patent No.: US 6,426,979 B1
(45) Date of Patent: Jul. 30, 2002

(54) ADAPTATION CONTROL ALGORITHM FOR ECHO CANCELLATION USING SIGNAL-VALUE BASED ANALYSIS

(75) Inventors: Xun Yang; Yan Zhou, both of Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/301,848

(22) Filed: Apr. 29, 1999

(51) Int. Cl.[7] .................................................. H04B 3/20
(52) U.S. Cl. ........................ 375/285; 375/350; 379/411; 370/291
(58) Field of Search ................................ 375/219, 285, 375/350; 370/290, 291; 379/410, 411

(56) References Cited

U.S. PATENT DOCUMENTS

| | | | |
|---|---|---|---|
| 5,307,405 A | 4/1994 | Sih | 379/410 |
| 5,526,347 A | 6/1996 | Chen et al. | 370/32.1 |
| 5,828,589 A * | 10/1998 | Degenhardt | 364/724.19 |
| 5,887,059 A | 3/1999 | Xie et al. | 379/410 |
| 6,256,383 B1 * | 7/2001 | Chen | 379/411 |

FOREIGN PATENT DOCUMENTS

| | | | |
|---|---|---|---|
| EP | 0 501 451 A2 | 2/1992 | H04M/9/08 |
| EP | 0 596 610 A2 | 10/1993 | H04B/3/23 |
| EP | 0 727 882 A2 | 1/1996 | H04B/3/23 |

* cited by examiner

Primary Examiner—Amanda T. Le
(74) Attorney, Agent, or Firm—Williams, Morgan & Amerson

(57) ABSTRACT

The present invention addresses signal noise problems associated with telecommunications. In particular, echo cancellation is addressed by the present invention, which employs an inventive adaptive filtration scheme. In one aspect of the invention, a method is provided for controlling an adaptive balance filter. In another aspect of the invention, an apparatus is provided for controlling an adaptive balancing filter, comprising: a transmit path; an adaptive balance control circuit; and a receive path.

20 Claims, 14 Drawing Sheets

ADAPTATION CONTROL ALGORITHM FOR ECHO CANCELLATION USING SIGNAL-VALUE BASED ANALYSIS

BACKGROUND OF THE INVENTION

1. Field of the Invention

This invention relates generally to wire and wireless communications, and, more particularly, to a method and apparatus for adaptation control for echo cancellation.

2. Description of the Related Art

The proliferation of telecommunications technology has brought many innovations that improve our ability to communicate effectively. The availability of advanced methods of communications also brings forth the need for creative solutions to problems encountered in implementing new advancements. The complex world of signals-in-transit demands intricate solutions to issues not readily contemplated by many in the field. One such issue occurs when one line connects two points of signal originations, or when multiple signals share a common path. In these situations, echoes from the original signals are generated, interfering with all of the signals on the line. The ability to deal with this problem effectively is critical to the quality of the sound and data that can be transmitted and received, particularly during teleconferences and data exchange sessions, such as modulator-demodulator (modem) use.

High-quality audio is a key component of teleconferencing. However, audio quality can be substantially diminished by signal echo. Echo can occur when a signal encounters an impedance mismatch at any point of the signal line, such as at any point on a telephone circuit. When a signal encounters a point of impedance mismatch, the signal is reflected from that point as an echo. The echo can interfere with signals from a far end point of origination, called a far-end signal. These echoes render the far-end speech signal corrupt and can cause significant degradation of the signal, and as such, are not desirable. Furthermore, echo problems can also cause severe problems during data exchange sessions, such as the operation of modems, used for the transmission of digital signals over telephone lines. Among the problems that can occur during data communication sessions are high bit-error rates and connection termination.

During a voice telecommunication session, echoes can cause unacceptable corruption of signals. Among the problems echoes can cause are: clipping, where a speaker's voice is broken up; dropout, where the voice is suddenly cut off when any noise is introduced at the connecting site; attenuation, where a momentary loss of volume occurs during the voice communication; and artifacts, where unintelligible voice remnants are heard during pauses.

Audio systems typically employ some form of an echo cancellation feature. Nevertheless, audio quality can suffer as a result of an ineffective echo cancellation mechanism. Digital filters can be used to implement echo cancellation circuits. Generally, a dynamic system, known as an adaptive balancing circuit, is used for echo cancellation. Adaptive balance systems seek coefficients for its digital balancing filter to maintain echo cancellation. The filter coefficients are changed accordingly with changing conditions in the communication line.

Due to mismatches in the impedance characteristics of the communication lines, some energy from the received far-end signal is reflected back and turned into an unwanted echo at the near-end signal point of origin. To minimize the effect of the near-end echo, an adaptive filter is employed. This adaptive filter performs auto-balancing functions by automatically adjusting its response by matching its filter coefficients to the varying conditions in the signal line.

Even with the implementation of adaptive filters, certain problems remain. The current methods employed in adaptive filters are error-prone and require additional circuitry to eliminate signal errors. Furthermore, current adaptive filters lack the accuracy to effectively eliminate errors when both near-end and far-end signals appear at the same time. This double-talker situation causes current adaptive filters and adaptive filter control circuits to be inaccurate, and more costly and complex to implement.

Some embodiments of the current implementations of adaptive filters employ sign-based algorithms, which require further integer estimations and additional comparator circuitry. Also, the sine-based algorithms require the use of multiple stages of correlations of signals. These shortfalls create problems in many telecommunication applications, including telephone conversations, tone divergence situations, double-talker situations, and modem connections.

The present invention is directed to overcoming, or at least reducing the effects of, one or more of the problems set forth above.

SUMMARY OF THE INVENTION

In one aspect of the invention, a method is provided for controlling an adaptive balance filter. The method comprises performing a correlation function upon a first input signal, the first input signal being a signal from a far-end location of a communication line, with a second input signal, the second input signal being an echo signal resulting from the signal from the far-end location; calculating a value of the correlation; determining an error threshold value; determining a correlation threshold value; determining whether a third input signal, the third input signal being a signal from a near-end location of the communication line, is an error signal or an actual communication signal; determining whether to perform adaptive filtering upon the third input signal, based upon the determination of whether the third input signal is an error or an actual communication signal; determining whether the value of correlation exceeds the error threshold value; determining whether the value of correlation exceeds the correlation threshold value; and adjusting an adaptive balance filter responsive to the calculation of the value of correlation based upon the determination whether the value of correlation exceeds the error threshold value and the determination whether the value of correlation exceeds the correlation threshold value.

In another aspect of the invention, an apparatus is provided for controlling an adaptive balancing filter. The apparatus comprises a transmit path, an adaptive balance control circuit, and a receive path.

BRIEF DESCRIPTION OF THE DRAWINGS

The invention may be understood by reference to the following description taken in conjunction with the accompanying drawings, in which like reference numerals identify like elements, and in which.

Figure 1:
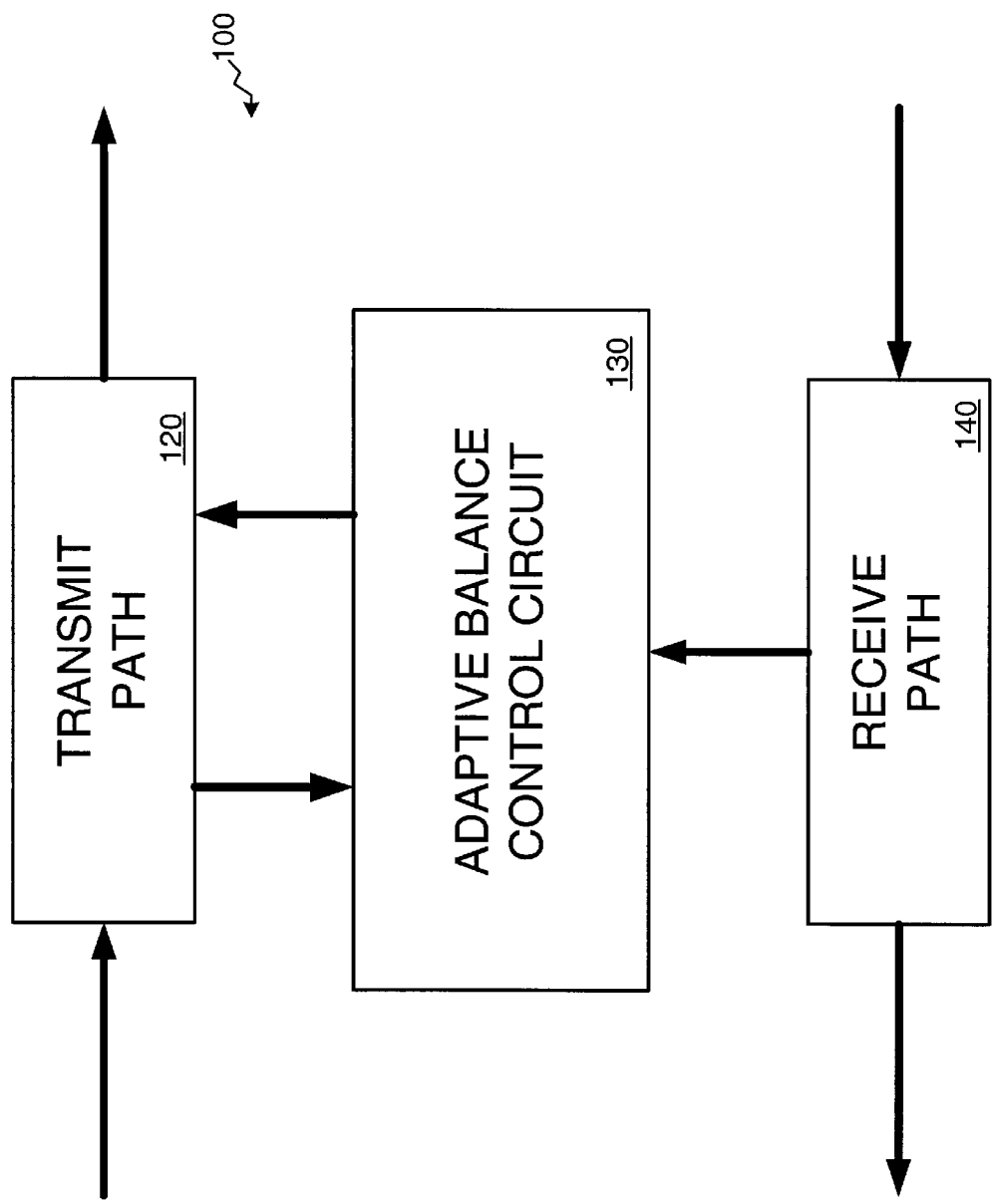
FIG. 1 illustrates a top-level block diagram of an embodiment of an apparatus for the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the drawings, wherein like or similar elements are designated with identical reference numerals throughout the several views, and more particularly to FIG. 1, an embodiment of a subscriber line audio processing unit 100 is shown. FIG. 1 illustrates a transmit path 120, an adaptive balance control circuit 130, and a receive path 140. The adaptive balance control circuit 130 functions to adaptively cancel echoes, and thereby improve the quality of communications over both the transmit and receive paths 120, 140.

Figure 2:
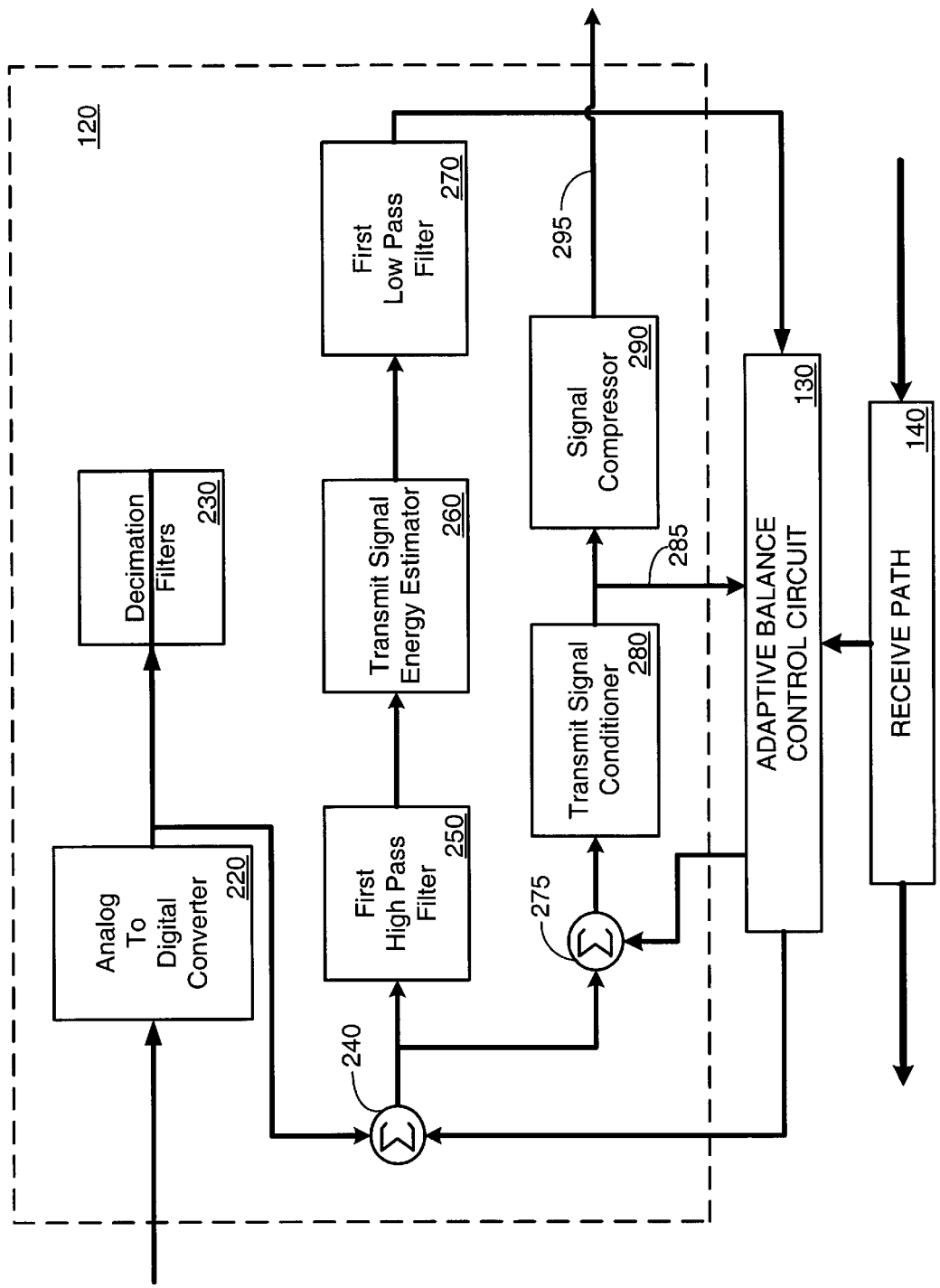
FIG. 2 depicts a more detailed block diagram of one embodiment of a transmit portion of the present invention.

The transmit path 120 of FIG. 1 is generally depicted by arrows pointing toward the right, and the receive path 140 of FIG. 1 is generally depicted by arrows pointing toward the left. The transmit path 120 of FIG. 1 is illustrated in greater detail in FIG. 2. Turning now to FIG. 2, an analog-to-digital (A/D) converter 220 in the transmit path 120 converts analog signals into signals that are digital PCM samples. The digital PCM signal is then sent through a decimation filter 230, which may in practice be comprised of a series of decimation filters 230. In one embodiment, the A/D converter 220 samples the analog signal at a relatively high sample rate, for example, at a sample rate of 4 million samples per second (4 Megahertz). This high rate of sample demands a great deal of bandwidth. To process the sampled signal in a more practical manner, the output signal from the A/D converter 220 is down-sampled at a lower sample rate, for example, at 16 thousand samples per second (16 Kilohertz). The decimation filter 230 is employed such that the output signal from the A/D converter 220 is down-sampled and presented to subsequent filters as a low-sampled signal.

The output of the decimation filter 230 is sent to a first summing junction 240. The first summing junction 240 also receives a signal from a digital pre-balance circuit 610, which is located in the adaptive balance control circuit 130 (see FIG. 6), which is described below in greater detail. Turning back to FIG. 2, the output of the first summing junction 240 is sent to a first high pass filter 250. In one embodiment, the first high pass filter 250 has a 3 dB cutoff frequency of 70 Hertz. The primary function of the first high pass filter 250 is to reduce any DC offset voltages that may be present in the signal.

The output of the first high pass filter 250 is sent to a transmit signal energy estimator 260. The function of the transmit signal energy estimator 260 is to estimate the power of the signal that is to be transmitted. The transmit signal energy estimator 260 calculates an average value of the square function of the signal. This, in combination with a first low pass filter 270, provides an estimate of the signal energy. The first low pass filter 270 functions primarily as a signal integrator. The square and integration functions are used to provide an estimate of the energy of the transmit signal. The signal energy data is then sent to the adaptive balance control circuit 130 for comparison, which is described below in greater detail.

The output from the first summing junction 240 is also sent to an input of a second summing junction 275. This signal is then summed with an output signal from an adaptive balance filter 620, located in the adaptive balance control circuit 130 (see FIG. 6). Turning back to FIG. 2, the output of the second summing junction 275 is sent to a transmit signal conditioner 280. The transmit signal conditioner 280 is described in further detail in FIG. 3.

Figure 3:
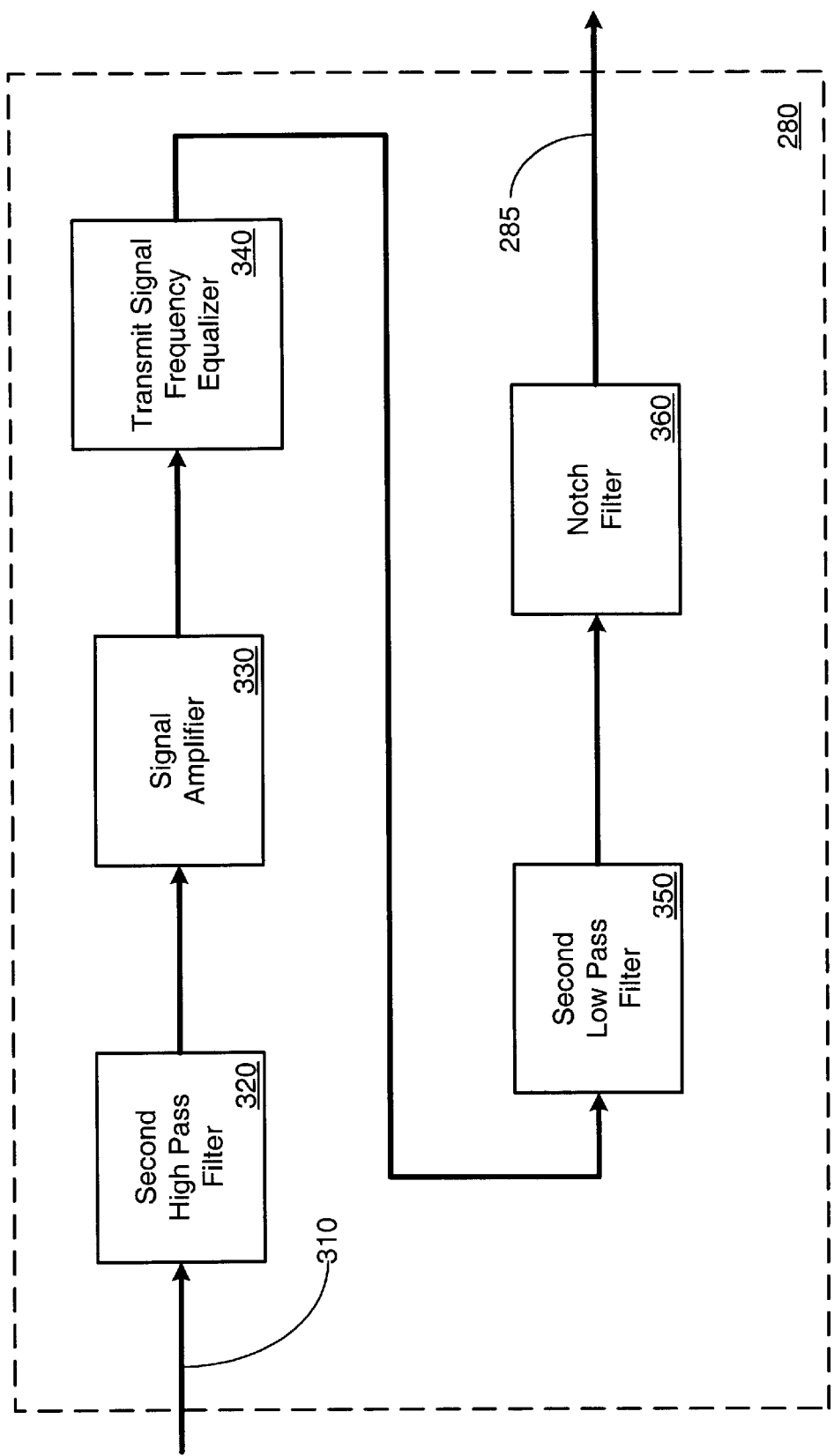
FIG. 3 depicts a more detailed block diagram of one embodiment of a Transmit Signal Conditioner of the transmit portion of the present invention.

As seen in FIG. 3, the signal (on a line 310) sent to the transmit signal conditioner 280 is first sent through a second high pass filter 320. In one embodiment, the second high pass filter 320 can have a 3 dB cutoff frequency of 40 Hertz. The primary purpose of the second high pass filter 320 is to reduce any DC offset voltage present in the transmit signal. Once the DC offset voltage is reduced, the signal is sent to a signal amplifier 330, which in one embodiment can have a 12 dB gain, but is also programmable to other desired gain values.

The output of the signal amplifier 330 is sent to the transmit signal frequency equalizer 340. The transmit signal frequency equalizer 340, in one embodiment, can be a programmable finite-input-response (FIR) filter. The transmit signal is then passed through a second low pass filter 350. In one embodiment, the second low pass filter 350 can have a 3 dB cutoff frequency of 3400 Hertz. The coordination of the second high pass filter 320 and the second low pass filter 350 essentially creates the effect of a bandpass filter.

The output from the second low pass filter 350 is sent through a notch filter 360, which eliminates the components of a particular desired frequency. Often, signal noise from sources like power lines attaches itself onto a host signal. This parasitic signal can cause signal corruption. A notch filter 360 can reduce the effect of the parasitic signal noise, if the frequency of the signal noise can be identified. In one embodiment, the notch filter 360 can be used to reduce signal noise that has a 50 to 60 Hertz component. The output of the notch filter 360 is the output of the transmit signal conditioner 280. The output of the transmit signal conditioner 280, on a line 285, is sent to a correlator function circuitry 630 in the adaptive balance control circuit 130 (see FIG. 6).

Turning back to FIG. 2, the output of the transmit signal conditioner 280, on the line 285, is sent to a signal compressor 290. In one embodiment, the signal compressor 290 converts 14-bit linear digital data into $\mu$-law coded 8-bit PCM data. In an alternative embodiment, the signal compressor 290 can convert 13-bit linear digital data into A-law coded 8-bit PCM data. The PCM data is sent onto the PCM highway via a line 295.

Figure 4:
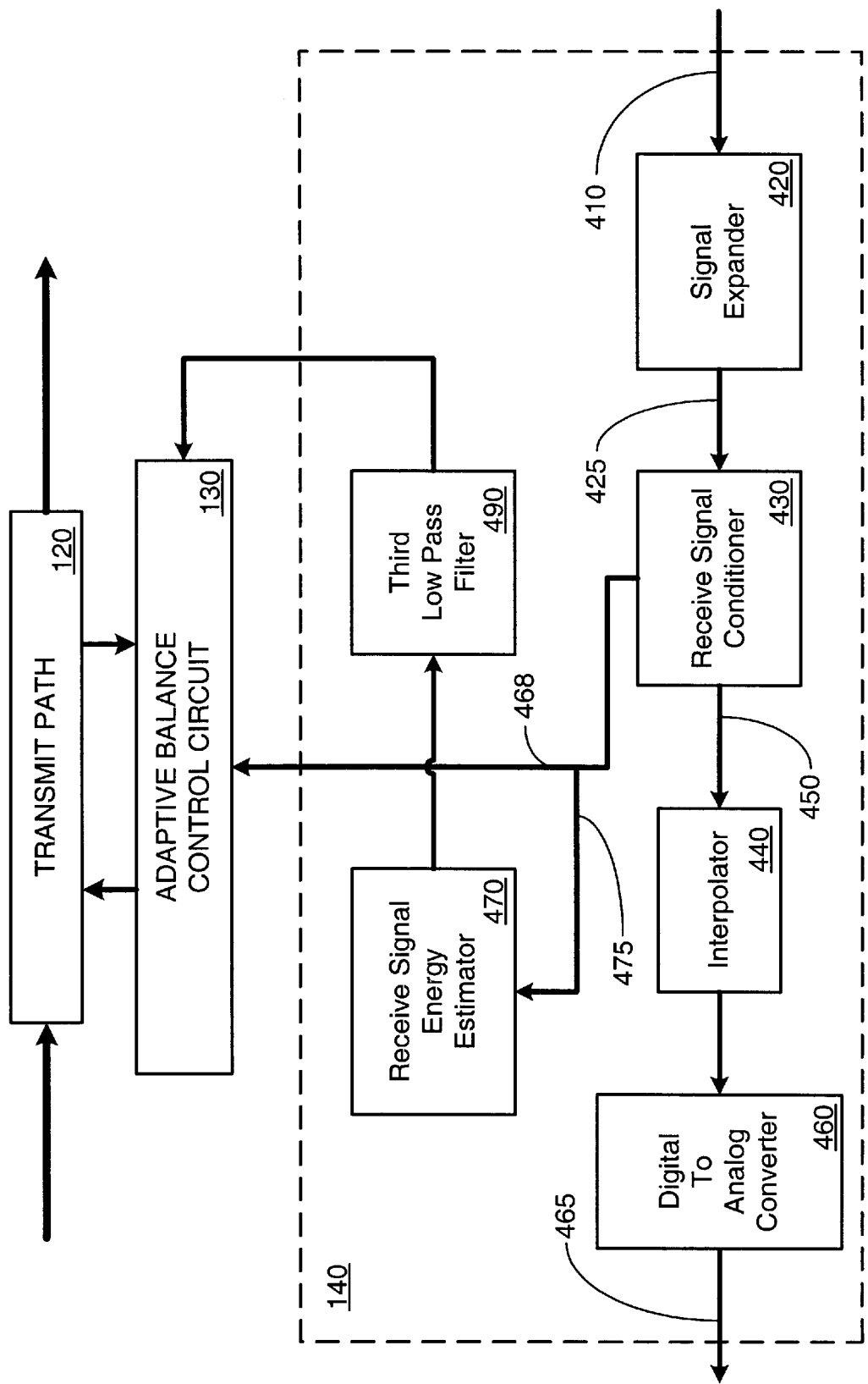
FIG. 4 depicts a more detailed block diagram of one embodiment of a receive portion of the present invention.

Turning now to FIG. 4, the receive path 140 is shown in greater detail. Signals from the PCM highway are received on a line 410 by the receive path 140. A signal expander 420, in the receiver path 140, receives the PCM data from the PCM highway. In one embodiment, the signal expander 420 converts $\mu$-law coded 8-bit PCM data into 14-bit linear digital data. In an alternative embodiment, the signal expander 420 converts A-law coded 8-bit PCM data into 13-bit linear digital data. Signal conditioning is then performed on the received data.

After conversion of the received PCM signal into the linear digital signal, it is sent to a receive signal conditioner 430. The receive signal conditioner 430 is illustrated in greater detail in FIG. 5. The signal from the signal expander 420 is sent into the receive signal conditioner 430 via a line 425.

Figure 5:
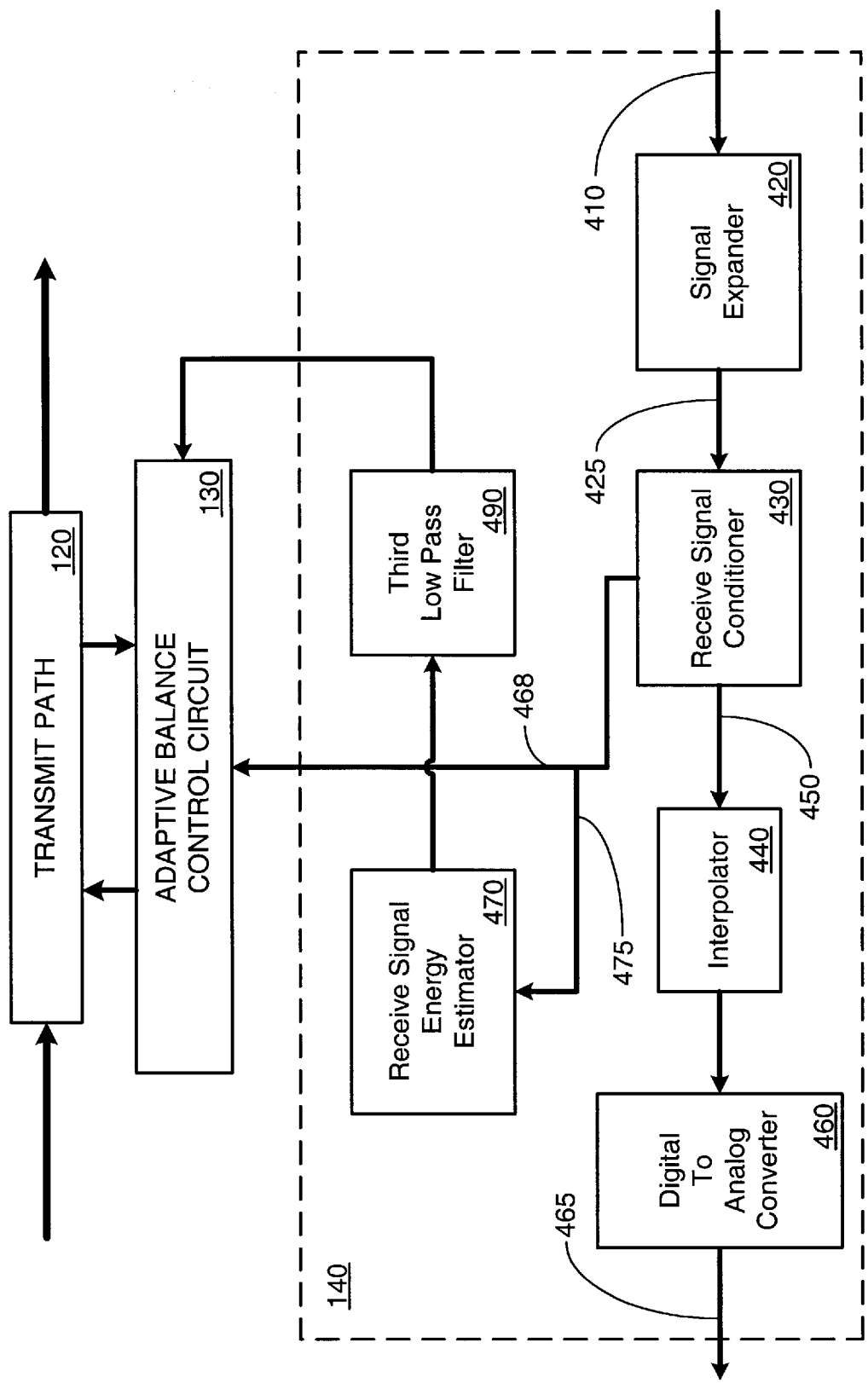
FIG. 5 depicts a more detailed block diagram of one embodiment of a Receive Signal Conditioner of the receive portion of the present invention.

The signal delivered to the receive signal conditioner 430, on the line 425, is first sent to a fourth low pass filter 520, as shown in FIG. 5. In one embodiment, the fourth low pass filter 520 has, for example, an approximately 3 dB cutoff frequency of about 3400 Hertz. The output signal from the fourth low pass filter 520 is then sent to a receive signal frequency equalizer 530. The receive signal frequency equalizer 530, in one embodiment, can be a programmable finite-input-response (FIR) filter. The output from the receive signal frequency equalizer 530 is sent through a signal attenuator 540. The signal attenuator 540 is an adjustable attenuator. In one embodiment, the signal attenuator 540 can attenuate the receive signal anywhere in the range of about 0 to 12 dB. The signal attenuator 540 is primarily present to provide a signal loss.

The output of the signal attenuator 540, which is the output of the receive signal conditioner 430, is sent to three different locations. First, the output of the receive signal conditioner 430 is sent to an interpolator 440, via line 450. The output of the interpolator 440 is delivered to a digital-to-analog (D/A) converter 460. The interpolator 440 and the D/A converter 460 convert the linear code into an analog signal, which is present on line a 465.

Figure 6:
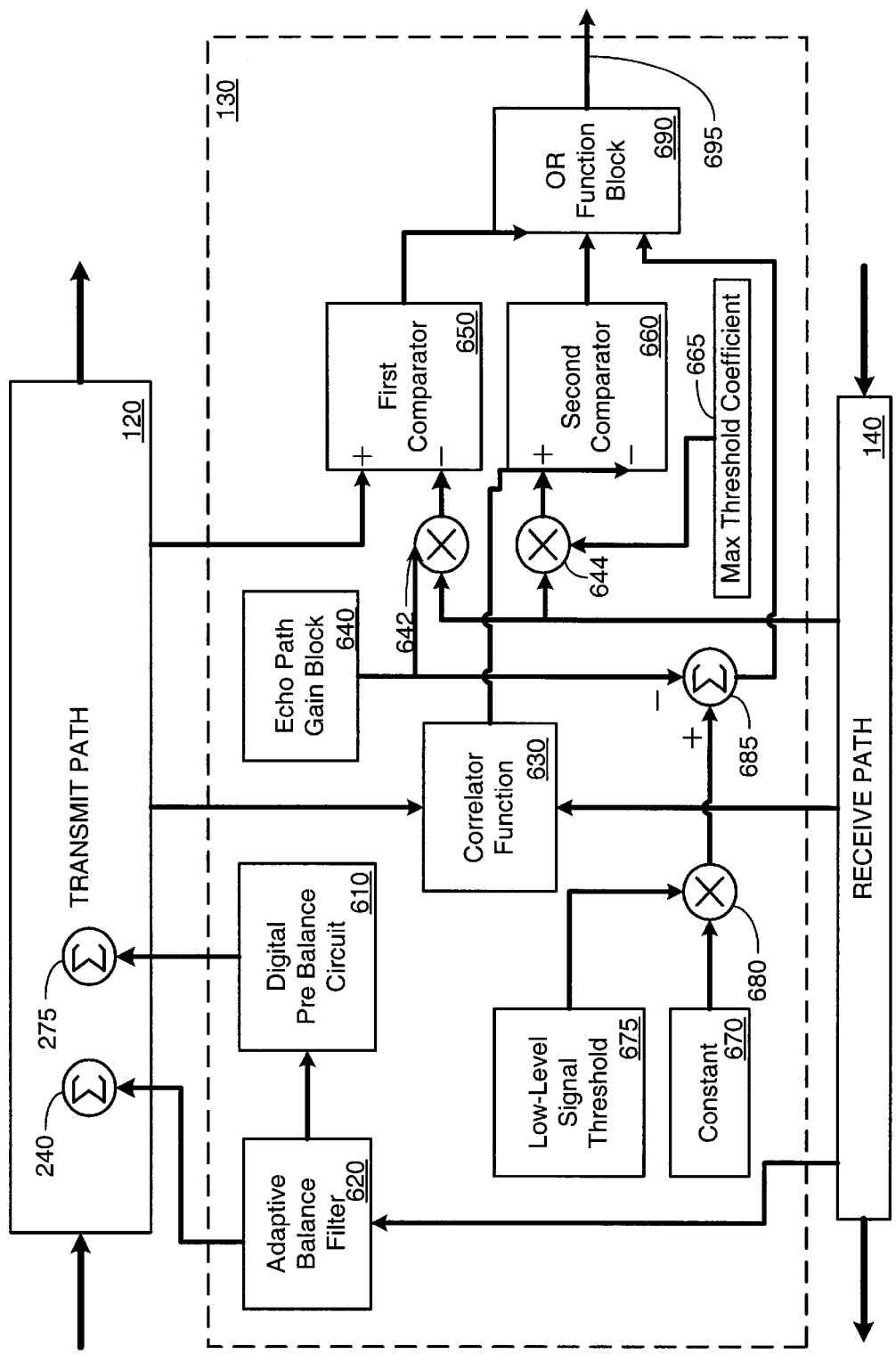
FIG. 6 depicts a more detailed block diagram of one embodiment of an Adaptive Balance Control Circuit of the present invention.

Secondly, the output of the receive signal conditioner 430 is also sent to the adaptive balance control circuit 130, via a line 468, to be used by the adaptive balance filter 620, as shown in FIG. 6 and described below. Turning back to FIG. 4, thirdly, the output of the receive signal conditioner 430 is also delivered to a receive signal energy estimator 470, via a line 475.

The function of the receive signal energy estimator 470 is to estimate the power of the signal received. The receive signal energy estimator 470 calculates an average value of the square function of the signal. This, in combination with a third low pass filter 490, provides an estimate of the signal energy. The third low pass filter 490 functions primarily as a signal integrator. The square function, along with the integration function, are used to provide an estimate of the energy of the transmit signal. The signal energy data is then sent to the adaptive balance control circuit 130 for comparison, which is described below in greater detail.

Turning now to FIG. 6, the adaptive balance control circuit 130 is shown in greater detail. A digital pre-balance circuit 610 receives a filtered signal from the adaptive balance filter 620. The digital pre-balance circuit 610 provides a fixed scaling of the signal. In other words, the digital pre-balance circuit 610 cancels part of the echo, but the filteration effect of the digital pre-balance circuit 610 is not adaptive. The output of the digital pre-balance circuit 610 is added to the signal in the transmit path 120 by delivering its output signal to the first summing junction 240, located in the transmit path 120.

Figure 7:
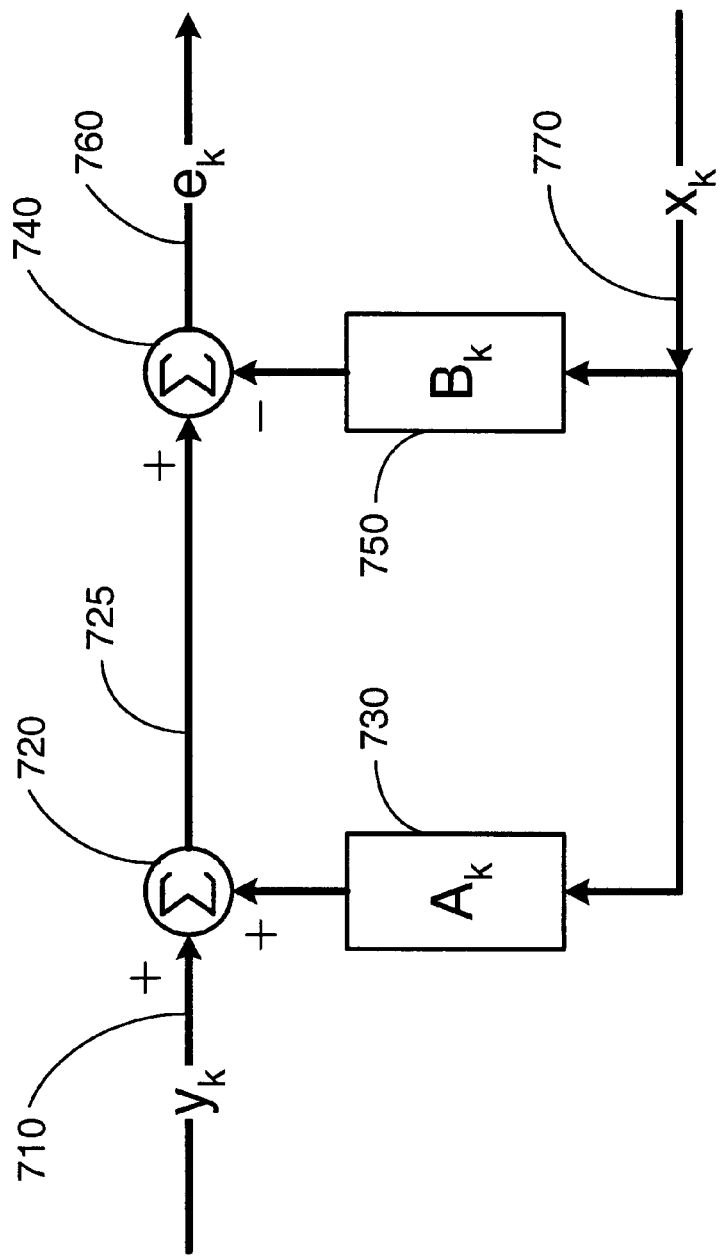
FIG. 7 depicts an illustration of the general architecture of an Adaptive Balance Filter of the present invention.

The adaptive balance filter 620 reduces the echo signal from the far-end signal, which is received through the receive path 140. The filter coefficient in the adaptive balance filter 620 adapts to changing conditions, as determined by the adaptive balance control circuit 130. A general, overall architecture of the adaptive balance filter 620 is illustrated in FIG. 7. The near-end signal is received on a line 710 and is represented by the symbol $y_k$. The far-end signal is received on a line 770 and is represented by the symbol $x_k$. A line 760 carries the combined, filtered signal and is represented by the symbol $e_k$. A block 730 represents an echo path impulse response and is represented by the symbol $A_k$. A block 750 represents an impulse response for the adaptive filter 620 and is represented by the symbol $B_k$.

The adaptive filter 620 is balanced and the effects of the echo signals are reduced by using the results derived from a correlation function performed on $e_k$ and $x_k$. The correlation function handles double-talker control by detecting the correlation between a far-end signal and echo residue. In addition, the correlation function shows the error level at the transmit path. Thus, the adaptive balance filter 620 can be then appropriately adjusted to reduce signal error problems.

Continuing to refer to FIG. 7, the overall adaptive balance filtering is further described. The far-end signal on the line 770 is added to the near-end signal located on the line 710 by employing the input summation junction 720. At this point, on the line 725, the summed signal also includes echo signals that were part of the far-end signal from the line 770. By using the adaptive filter impulse response, $B_k$, a portion of the echo signals are canceled by subtracting them from the summed signal on the line 725. This subtraction is performed by the output summation junction 740. Thus, the output signal, $e_k$, has as its components the near-end signal and the far-end signal, while most of its echo signal components are canceled from its aggregation.

The correlation function of $e_k$ and $x_k$ is illustrated by Equation 1 and its derivations. The correlation function of $e_k$ and $x_k$ is:

$$\sum_{k=0}^{K} e_k \cdot x_k; \quad \text{Equation 1}$$

which can be expanded to $$\sum_{k=0}^{K} ((A_k - B_k) \cdot x_k + y_k) \cdot x_k;$$

which is further expanded to $$\sum_{k=0}^{K}\sum_{n=0}^{K} (A_n - B_n) \cdot x_{k-n} \cdot x_k + \sum_{k=0}^{K} y_k \cdot x_k.$$

By employing an approximation, this equation can be simplified. Since a far-end signal and a near-end signal are uncorrelated, it can be concluded that $$\sum_{k=0}^{K} y_k \cdot x_k = 0,$$

thus, the approximation results in Equation 2.

$$\sum_{k=0}^{K} echo_k \cdot x_k. \quad \text{Equation 2}$$

Furthermore, by normalizing Equation 2 with the energy of the far-end signal $x_k$ (which is an average of the square of the signal function), a correlation threshold can be obtained. By normalizing Equation 2 and approximating an average four wire return loss (FWRL) of the system, the equation can be simplified to:

$$\frac{\sum_{k=0}^{K} e_k \cdot x_k}{\sum_{k=0}^{K} x_k^2} = FWRL, \quad \text{Equation 3}$$

which indicates the residue-error level at $e_k$. So long as the value of the correlation is less than the four wire return loss, adaptation can be terminated.

The worst case error threshold that is used is the maximum of the error level threshold ($T_{elt}$), and the correlation threshold ($T_{cor}$). Adaptation should be stopped if the value of Equation 3 is less than the worst case of either $T_{elt}$ or $T_{cor}$. The symbol, T, can be defined as the worst-case maximum threshold value 665, from the group of $T_{elt}$ and $T_{cor}$. When convergence to the maximum threshold value 665, T, is achieved, adaptation of the adaptive balance filter 620 can be terminated. Equation 4 illustrates the condition in which termination of adaptation of the adaptive balance filter 620 is proper.

$$\frac{\sum_{k=0}^{K} e_k \cdot x_k}{\sum_{k=0}^{K} x_k^2} < \text{Max}(T_{elt}, T_{cor}) = T. \quad \text{Equation 4}$$

In addition, an uncorrelated near-end signal will not falsely start the adaptation process once the adaptive system reaches its steady state. This feature helps to maintain proper adaptation performance during a double talker condition.

The correlation function described above is performed by the correlation function block 630 (refer back to FIG. 6). The correlation function block 630 receives the far-end signal ($x_k$) from the receive path 140, and it receives the near-end signal to be transmitted ($e_k$) from the transmit path 120. An output signal from the correlator function block 630 is sent to be compared, which is described below.

The echo path gain block 640 applies the echo path gain (EPG), which is a programmable coefficient, to the receive signal. The output signal of the receive signal energy estimator 470, which is the receive signal energy (located in the receive path 140), is factored by the echo path gain, using an EPG factoring junction 642. The output signal of the EPG factoring junction 642 is sent to a first comparator 650 to be compared with the output signal of the transmit signal energy estimator 260, which is the transmit signal energy. The signal that represents the transmit signal energy is sent to the second input of the first comparator 650. Based upon this comparison, the first comparator 650 generates a logic signal that is sent to an OR function block 690. The OR function block 690 then generates a stop-adaptation signal on a line 695, based upon the logic signal sent by the first comparator 650. By selecting an appropriate error path gain factor, that is, a value that is less than the value of the trans-hybrid loss of the distant hybrid, the adaptation process can be terminated before an unstable oscillation begins. In the case where an inappropriate error path gain factor is selected, the echo reflected from a high impedance subscriber loop could prematurely terminate the adaptation process, thereby perpetuating the undesired effects of echo signals: This is one advantage of the digital pre-balance circuit 610, because it facilitates the use of a relatively low echo path gain value.

A second comparator 660 compares the correlation value to the receive signal energy (output from the receive signal energy estimator 460, from the receive path 140) factored by the maximum threshold value 665, T. The factoring of the receive signal energy with the maximum threshold value 665 is performed by a threshold factoring junction 644, which sends its output signal to an input port of the second comparator 660. Based upon the comparison of the correlation value and the factored energy signal, the second comparator 660 generates a logic signal that is sent to the OR function block 690. The OR function block 690 can then generate a stop-adaptation signal on the line 695, based upon the logic signal sent by the second comparator 660.

The OR function block 690 has a third input terminal that could prompt it to drive the stop-adaptation logic signal on the line 695, such that the adaptation process of the adaptive balance circuit will be terminated. A constant 670 and a low-level signal threshold (LST) 675, which can vary in some embodiments, are factored together by an LST factoring junction 680. The output signal of the LST factoring junction 680 is sent to an LST summation junction 685, where the echo path gain is subtracted from the factored value. Depending on the value of the constant 670, the LST 675, and the echo path gain, the output of the LST summation junction 685 can cause the OR function block 690 to drive the stop-adaptation signal on the line 695, causing the termination of the adaptation process.

Figure 8:
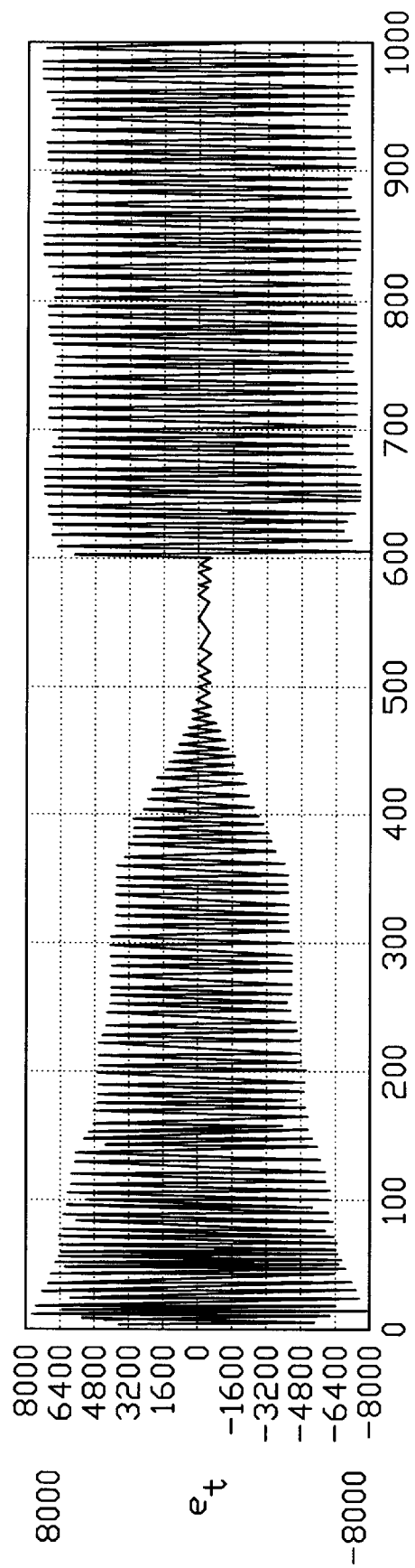
FIG. 8 illustrates the signal response of a sine wave, at the transmit path output, as it would be employed by the present invention.
Figure 9:
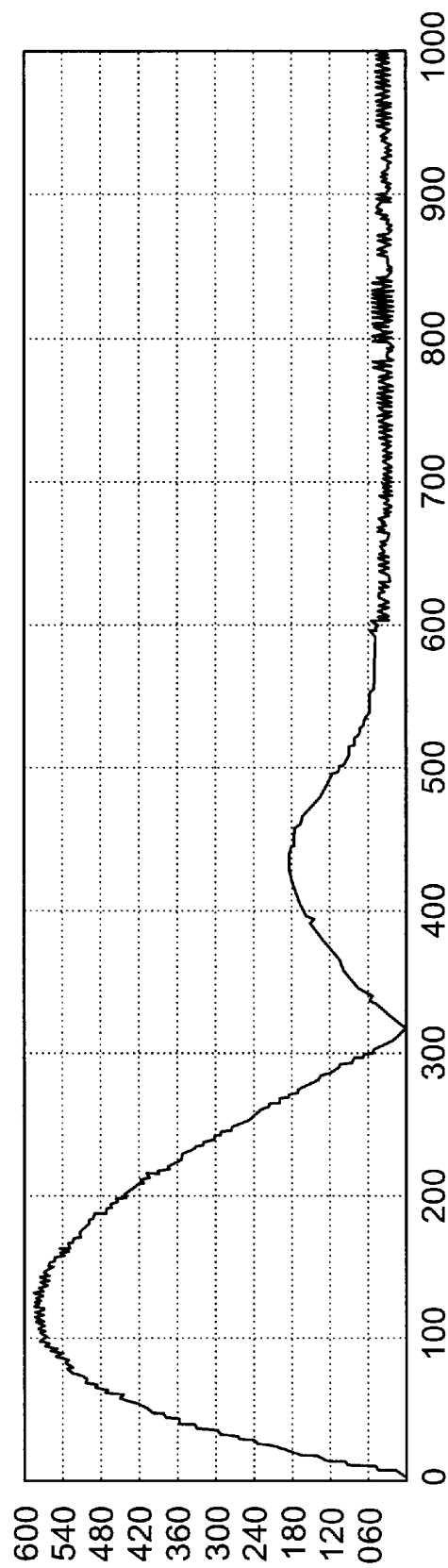
FIG. 9 illustrates a correlation function of an error signal and a far-end signal, as it would be employed by the present invention.

An example of an application of the present invention is described below and illustrated in FIGS. 8 and 9. The far-end signal in this example is a sine wave signal. Turning now to FIG. 8, the adaptation starts at time t=0 and the convergence is achieved at t=500. At time t=600, an uncorrelated sine wave is introduced as the near-end signal. Referring now to FIG. 9, those with ordinary skill in the art can see that with the convergence of the error signal, the correlation value decreases. Furthermore, an uncorrelated near-end signal does not disturb the adaptation balance sequence. This is true because the correlation of the current far-end and near-end signals results in a correlation value that is relatively low. Therefore, echo signal from the far-end signal is mostly cancelled out without the near-end signal being effected. Thus, under the present invention, erroneous adaptation is prevented when both parties on a line, far-end and near-end, talk at the same time.

Figure 10:
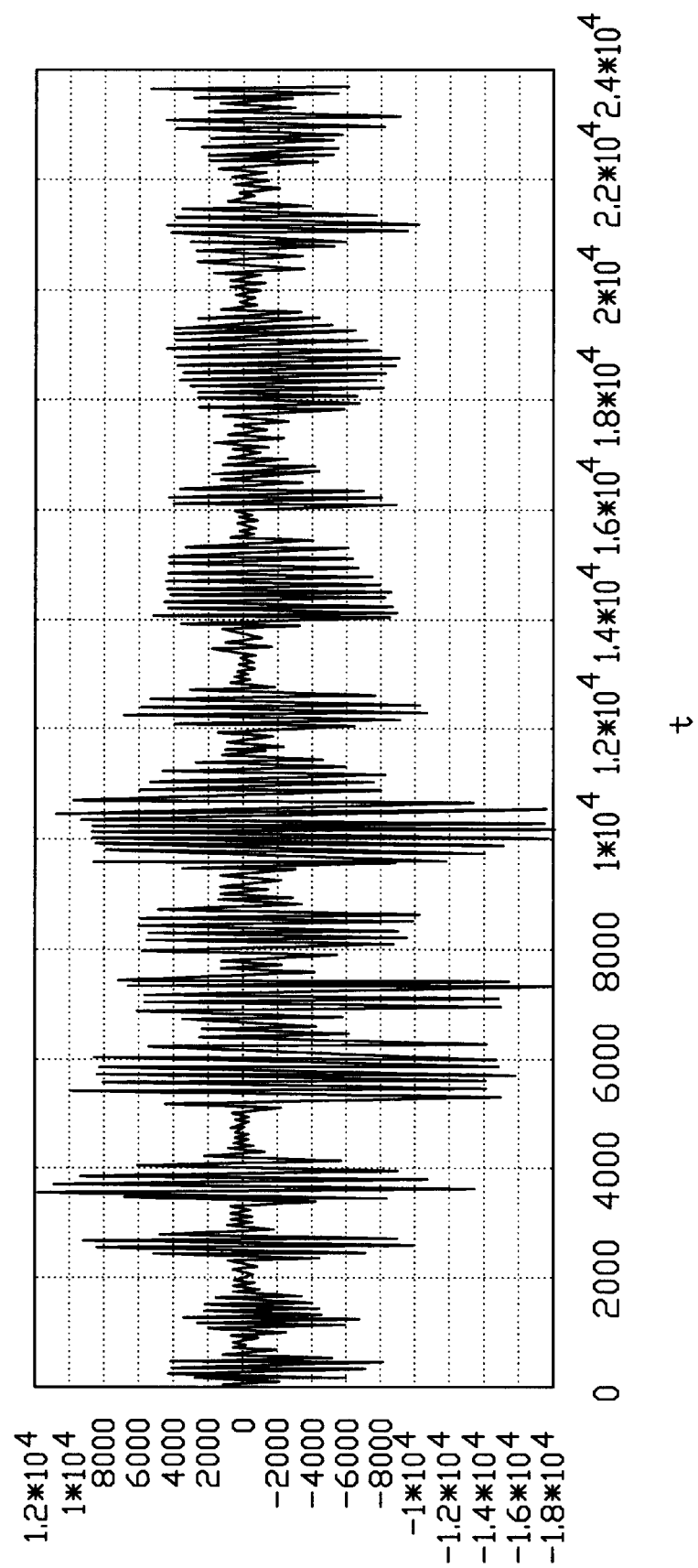
FIG. 10 illustrates a signal response of a far-end speech signal, as it would be employed by the present invention.
Figure 11:
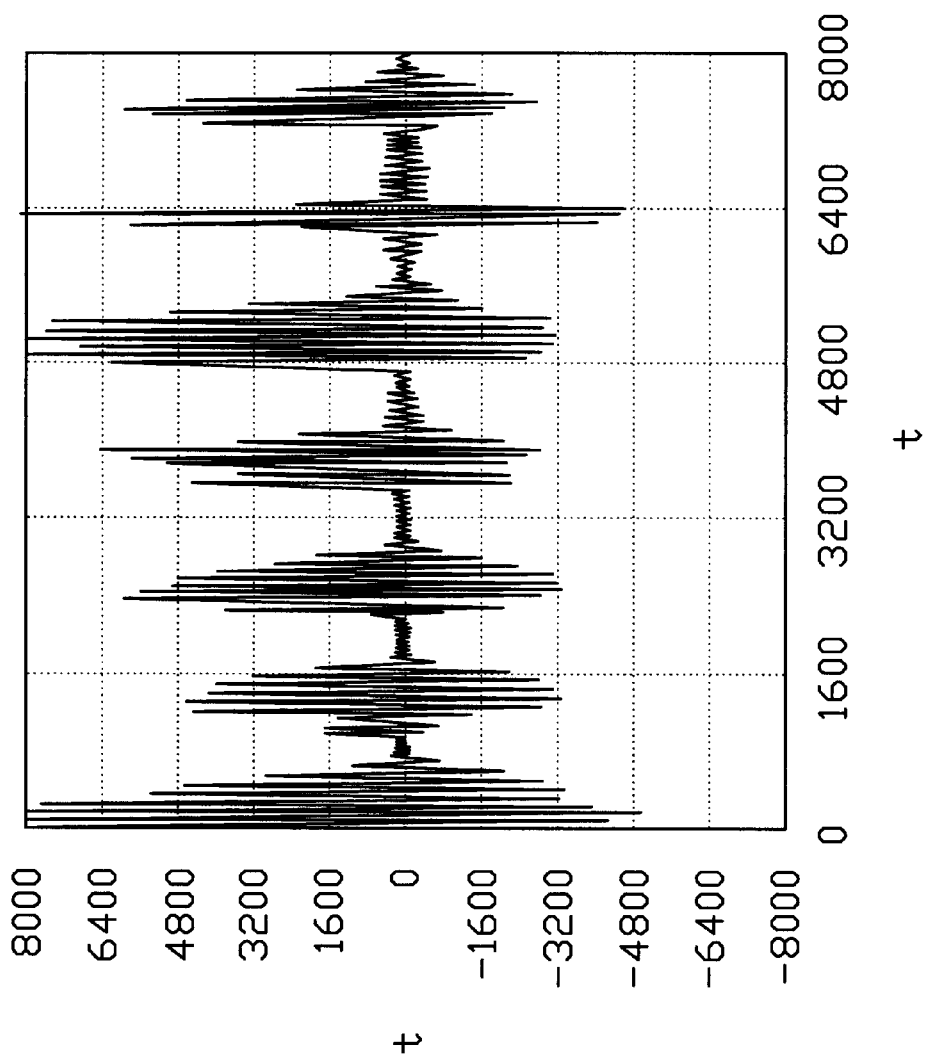
FIG. 11 illustrates a signal response of a near-end speech signal, as it would be employed by the present invention.

Another example illustrating an application of the present invention is described below. In this example, two speech-like uncorrelated signals are used, instead of pure sine waves. Turning now to FIG. 10, the far-end speech signal is shown. The far-end speech signal is applied at time t=0. Turning now to FIG. 11, the near-end speech signal is shown. The near-end speech signal is applied at time t=15, 650.

Figure 12:
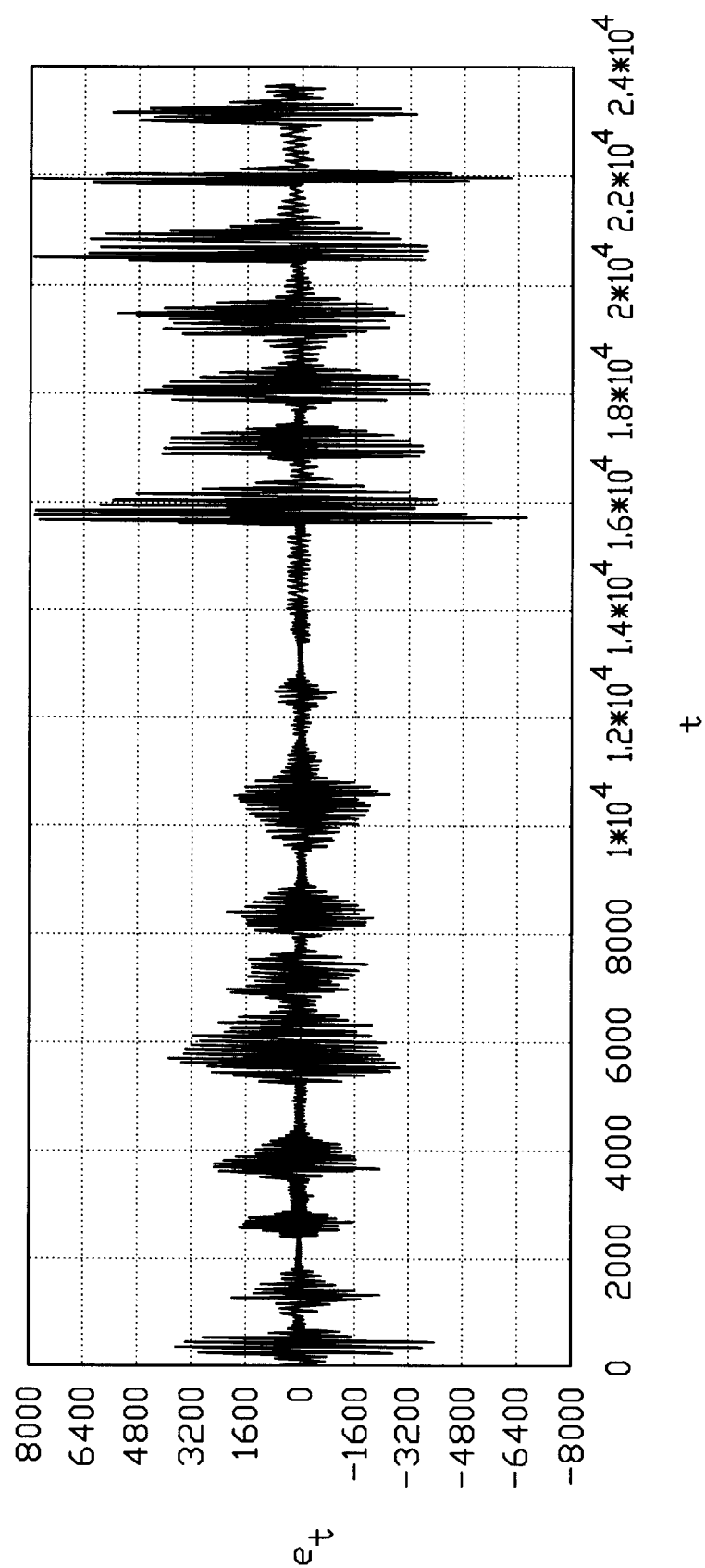
FIG. 12 illustrates a signal response of a transmit path output signal, as it would be employed by the present invention.

Turning now to FIG. 12, the transmit path output signal is illustrated. Examining the signal illustrated in FIG. 12, those with ordinary skill in the art can see that the echo of the far-end speech signal is reasonably cancelled by the adaptive balance filter 620. However, by continuing to examine FIG. 12, it can be seen that the adaptive balance filter 620 did not interfere with the signal integrity of the near-end speech signal, which was passed through with its signal characteristics intact.

Figure 13:
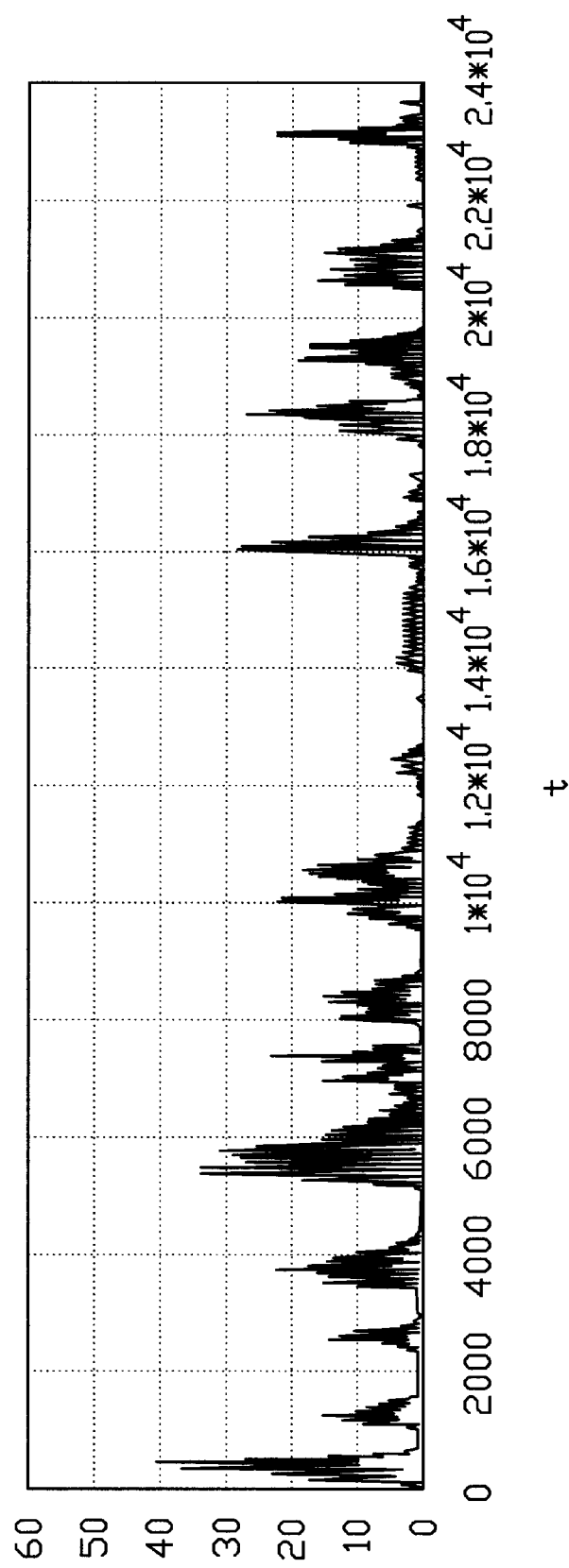
FIG. 13 illustrates a signal response of a correlation of the error signal and the far end signal, as it would be employed by the present invention.
Figure 14:
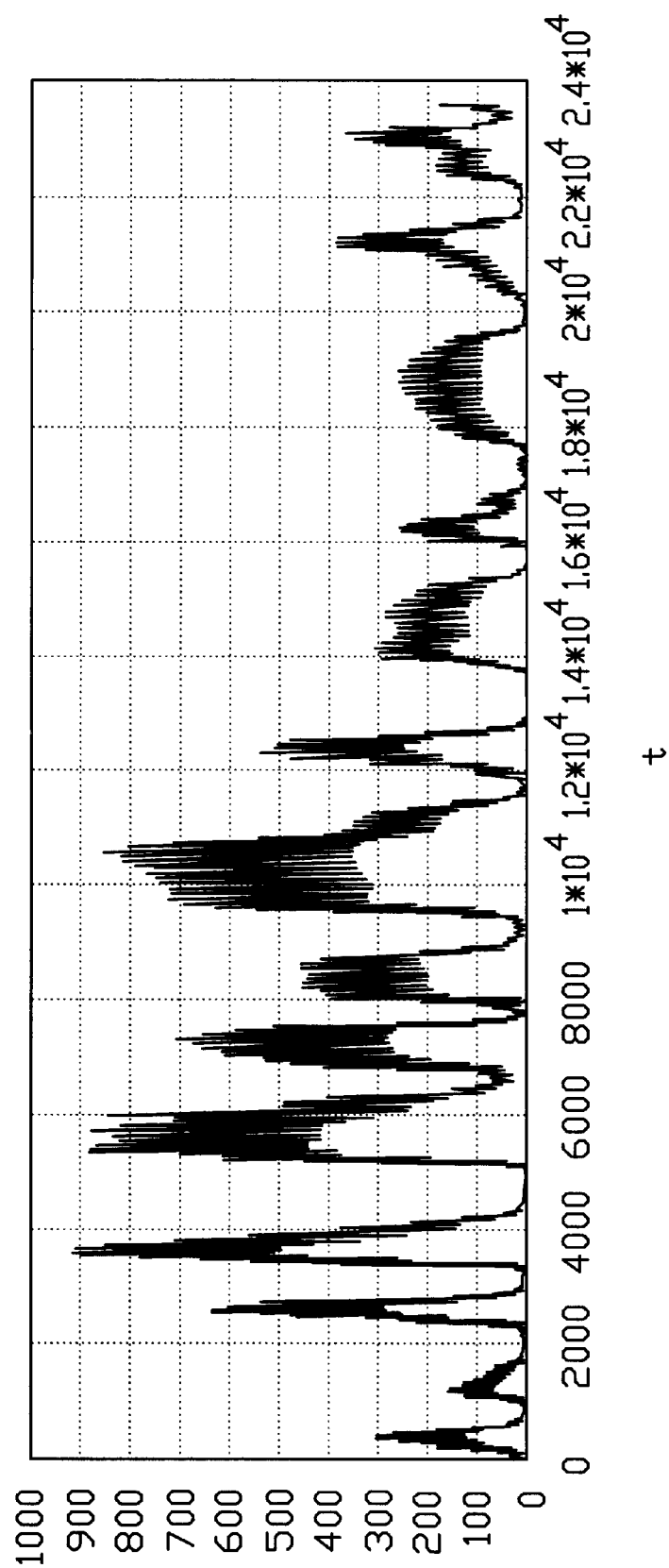
FIG. 14 illustrates a signal response of an autocorrelation of the far end signal, as it would be employed by the present invention.

Turning now to FIG. 13, the correlation function of the error (echo) signal and the far-end speech signal is illustrated. FIG. 14 illustrates the autocorrelation function of the error (echo) and the far-end speech signal. Examining these figures, those with ordinary skill in the art can see that after the echo signal converges, and after the introduction of the near-end speech signal, the correlation value is low enough such that the proper adaptation balance is not disturbed.

It will be appreciated by those of ordinary skill in the art having the benefit of this disclosure that numerous variations from the foregoing illustration will be possible without departing from the inventive concept described herein. Accordingly, it is the claims set forth below, and not merely the foregoing illustration, which are intended to define the exclusive rights of the invention.

What is claimed:

1. A method for controlling an adaptive balance filter, comprising:

performing a correlation function upon a first input signal, said first input signal being a signal from a far-end location of a communication line, with a second input signal, said second input signal being an echo signal resulting from said signal from said far-end location;

calculating a value of said correlation;

determining an error threshold value;

determining a correlation threshold value;

determining whether a third input signal, said third input signal being a signal from a near-end location of said communication line, is an error signal or an actual communication signal;

determining whether to perform adaptive filtering upon said third input signal, based upon said determination of whether said third input signal is an error or an actual communication signal;

determining whether said value of correlation exceeds said error threshold value;

determining whether said value of correlation exceeds said correlation threshold value; and adjusting an adaptive balance filter responsive to said calculation of said value of correlation based upon said determination whether said value of correlation exceeds said error threshold value and said determination whether said value of correlation exceeds said correlation threshold value.

2. The method as described in claim 1, wherein calculating value of said correlation comprises normalizing said correlation with an energy of said first signal from far end.

3. The method as described in claim 1, wherein determining whether said value of correlation exceeds said error threshold value comprises approximating a four wire return system loss based upon a normalized correlation function.

4. The method as described in claim 3, wherein determining whether said value of correlation exceeds said error threshold value comprises comparing said four wire return system loss to said error threshold.

5. The method as described in claim 4, wherein said error threshold value is comprised of a worst case value of an error level threshold and a correlation level threshold.

6. The method as described in claim 1, wherein adjusting said adaptive balance filter comprises adjusting said coefficient of said adaptive balance filter based upon said determination that said value of correlation exceeds said error threshold value.

7. The method as described in claim 1, wherein adjusting said adaptive balance filter comprises terminating adaptation of said coefficient of said adaptive balance filter based upon said determination that said value of correlation does not exceed said error threshold value.

8. An apparatus for controlling an adaptive balancing filter, comprising:

an adaptive balance control circuit;

a receive path coupled with said adaptive balance control; and a transmit path coupled with said adaptive balance control circuit, the transmit path comprising:

an analog-to-digital converter;

a plurality of decimation filters coupled with said analog-to-digital converter;

a plurality of summing junctions wherein at least one of said summing junctions being coupled with said decimation filters and at least one of said summing junctions being coupled with said adaptive balance control circuit;

a first high pass filter coupled with at least one of said summing junctions;

a first signal energy estimator function circuit coupled with said first high pass filter;

a first low pass filter wherein said first low pass filter being coupled with said first signal energy estimator function circuit and said first low pass filter being coupled with said adaptive balance control circuit;

a transmit signal conditioner wherein said transmit signal conditioner being coupled with at least one of said summing junctions and said transmit signal conditioner being coupled with said adaptive balance control circuit; and a signal compressor coupled with coupled with said transmit signal conditioner.

9. The apparatus of claim 8, wherein said transmit signal conditioner comprises:

a second high pass filter;

a signal amplifier coupled with said second high pass filter;

a transmit frequency equalizer coupled with said signal amplifier coupled;

a second low pass filter coupled with said transmit frequency equalizer; and a notch filter coupled with said second low pass filter.

10. The apparatus of claim 9, wherein said notch filter is capable of reducing an effect of 50 to 60 Hz signals and other power line signal frequencies.

11. The apparatus of claim 9, wherein said receive path comprises:

a receive signal energy estimator function circuit;

a third low pass filter wherein said third low pass filter being coupled with said receive signal energy and said third low pass filter being coupled with said adaptive balance control circuit;

a receive signal conditioner wherein a first output port on said receive signal conditioner is coupled with said receive signal energy estimator and a second output port on said receive signal conditioner being coupled with said adaptive balance control circuit;

a signal expander coupled with said receive signal conditioner; and at least one interpolator coupled with said receive signal conditioner.

12. The apparatus of claim 11, wherein said receive signal conditioner further comprises:

a fourth low pass filter;

a receive signal frequency equalizer coupled with said fourth low pass filter; and a signal attenuator coupled with said receive signal frequency equalizer.

13. An apparatus for controlling an adaptive balancing filter, comprising:

an adaptive balance control circuit;

a transmit path coupled with said adaptive balance control circuit; and a receive path coupled with said adaptive balance control, wherein said adaptive balance control circuit comprises:

an adaptive balance filter coupled with said transmit path and said receive path;

a digital pre-balance circuit coupled with said adaptive balance filter and said transmit path;

a plurality of multiplier function circuits;

an echo path gain detector circuit coupled with at least one of a plurality of multiplier function circuits;

a correlator function circuit coupled to said transmit path and said receive path;

a plurality of comparators coupled with said echo path gain detector circuit and at least one of said plurality of multiplier function circuits;

a summation function circuit coupled with said echo path gain detector circuit and at least one of said plurality of multiplier function circuits; and a logical OR function circuit coupled with at least one of said comparators and at least one of said plurality of multiplier function circuits.

14. The apparatus of claim 13, wherein said adaptive balance filter further comprises an adjustable filter coefficient that is capable of reducing any effects caused by a signal noise.

15. The apparatus of claim 14, wherein said signal noise that is being reduced by said adaptive balance filter is an echo signal.

16. The apparatus of claim 13, wherein said adaptive balance filter circuit is capable of allowing a far-end signal to be summed to a near-end signal and said adaptive balance filter circuit is capable of negatively summing a noise signal from said summation of far-end and near-end signal.

17. The apparatus of claim 13, wherein said correlator function circuit is capable of performing a correlation function upon a plurality of signals such that said correlation function results in a finding of a correlation value of said signals being correlated.

18. The apparatus of claim 13, wherein one of said plurality of comparators is capable of generating a logical output based upon a comparison of a near-end signal from said transmit path, and a far-end signal from said receive path, said far-end signal being factored by said echo path gain detector circuit.

19. The apparatus of claim 13, wherein one of said plurality of comparators is capable of generating a logical output based upon a comparison of a correlation value of a near-end signal and a far-end signal, and a far-end signal being factored by a threshold coefficient.

20. The apparatus of claim 13, wherein said logical OR function circuit is adapted to receive an output from said first comparator, an output from a second comparator, and a low-level signal threshold signal that is factored by a constant and negatively summed by said echo path gain detector circuit, and said logical OR function circuit is capable of producing an output signal that stops an adaptation process of said adaptive balance filter.

* * * * *